(12) United States Patent
Zhang et al.

(10) Patent No.: US 8,391,400 B2
(45) Date of Patent: Mar. 5, 2013

(54) CONTROL CHANNEL FORMAT INDICATOR FREQUENCY MAPPING

(75) Inventors: Xiaoxia Zhang, San Diego, CA (US); Durga Prasad Malladi, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1048 days.

(21) Appl. No.: 12/142,131

(22) Filed: Jun. 19, 2008

(65) Prior Publication Data

US 2009/0022235 A1   Jan. 22, 2009

Related U.S. Application Data

(60) Provisional application No. 60/945,293, filed on Jun. 20, 2007.

(51) Int. Cl.
*H04L 27/00* (2006.01)
(52) U.S. Cl. ............................ 375/295; 341/20; 341/173
(58) Field of Classification Search ................... 375/295
See application file for complete search history.

(56) References Cited

U.S. PATENT DOCUMENTS

| | | |
|---|---|---|
| 2004/0180675 A1 | 9/2004 | Choi et al. |
| 2007/0263529 A1* | 11/2007 | Ishikura et al. ............... 370/211 |
| 2008/0318579 A1* | 12/2008 | McCoy et al. ............... 455/442 |
| 2009/0015443 A1* | 1/2009 | Zhang et al. .................... 341/52 |
| 2010/0118800 A1* | 5/2010 | Kim et al. ...................... 370/329 |
| 2011/0117948 A1* | 5/2011 | Ishii et al. ...................... 455/509 |

FOREIGN PATENT DOCUMENTS

| | | |
|---|---|---|
| EP | 1420551 A2 | 5/2004 |
| RU | 2262811 | 10/2005 |
| WO | WO2006033424 A1 | 3/2006 |
| WO | WO2007037412 A1 | 4/2007 |
| WO | WO2007038358 | 4/2007 |

OTHER PUBLICATIONS

English Language Translation of U.S. Appl. No. 60/914,622, filed Apr. 27, 2007.*
International Search Report/Written Opinion—PCT/US08/067751—International Search Authority EPO—Dec. 12, 2008.
Mitsubishi Electric: "On fourth value of CCFI (Cat0)" 3GPP Draft; R1-072722_CATO, 3rd Generation Partnership Project (3GPP), Mobile Competence Centre ; 650, Route Des Lucioles ; F-06921 Sophia-Antipolis Cedex ; France, vol. tsg_ran\WG1-RL1\TSGR1_49b\Docs, No. Orlando, USA; 20070625, Jun. 19, 2007, XP050106409.

(Continued)

*Primary Examiner* — Erin File
(74) *Attorney, Agent, or Firm* — Darrell Scott Juneau; Peter A. Clevenger

(57) ABSTRACT

Systems and methodologies are described that facilitate selecting frequency for transmitting control channel format indicator (CCFI) data such to identify a related cell. In one example, the CCFI data can be transmitted in an initial portion of frequency (such as an orthogonal frequency division multiplexing (OFDM) symbol) in a time transmit interval (TTI). The CCFI data can be spread across the initial portion of frequency and be shifted to identify the transmitting cell. Additionally, the CCFI data can be scrambled to further identify the cell. The CCFI data can also be utilized to determine structure of subsequent control and/or data channels.

25 Claims, 11 Drawing Sheets

OTHER PUBLICATIONS

Qualcomm Europe: "CCFI Structure and multiplexing" 3GPP Draft; R1-072751, 3rd Generation Partnership Project (3GPP), Mobile Competence Centre ; 650, Route Des Lucioles ; F-06921 Sophia-Antipolis Cedex ; France, vol. tsg_ran\WG1_RL1\TSGRO1-49b\Docs, No. Orlando, USA; 20070625, Jun. 20, 2007, XP050106436.
"RAN1#49 Major Decisions—on LTE" [Online] May 22, 2007, pp. 1-4, XP002506461 Retrieved from the Internet : URL: http ://tonebrew. tistory. com/337> [retrieved on Dec. 2, 2008].
Dirk Gerstenberger, "Status Report RAN WG1 to TSG-RAN #36", 3GPP TSG RAN #36 RP-070271, May 1, 2007.
LG Electronics, "Cat0 Signaling Design", 3GPP RAN WG1 #49 R1-072352, May 11, 2007.
Nokia,"Transmission of Cat0 in the DL control channel", 3GPP TSG-RAN WG1 #49 R1-072300, May 11, 2007.
Samsung, "Cat0 Transmission Structure", 3GPP TSG RAN WG1 #49 R1-072601, May 11, 2007.
Taiwan Search Report—TW097123267—TIPO—Jun. 20, 2012.

* cited by examiner

CONTROL CHANNEL FORMAT INDICATOR FREQUENCY MAPPING

CROSS-REFERENCE TO RELATED APPLICATIONS

This application claims the benefit of U.S. Provisional Patent application Ser. No. 60/945,293 entitled "FREQUENCY MAPPING AND TRANSMISSION STRUCTURE OF DL ACK AND CCFI" which was filed Jun. 20, 2007. The entirety of the aforementioned application is herein incorporated by reference.

BACKGROUND

I. Field

The following description relates generally to wireless communications, and more particularly to frequency mapping of control channel format indicators and downlink acknowledgement signals.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems-time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennas can relate to both base stations and mobile devices, in one example, allowing bi-directional communication between the devices on the wireless network. In this regard, communications over the antenna can often interfere where similar frequencies are utilized by neighboring cells or sectors. Control channel format indicator (CCFI) allows for specification of a control channel structure, and is thus utilized to decode the control channel and/or shared channel. To this end, each receiver should be able to decode the CCFI at least to obtain the channel structures.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating frequency mapping of control channel format indicator (CCFI) and downlink (DL) acknowledgement (ACK) to allow for frequency and spatial diversity over multiple transmit antennas. The diversity can be achieved both by providing scrambling of the CCFI as well as providing a reuse factor over the bandwidth utilized to transmit the CCFI, and the DL ACK can be based at least in part on the CCFI. In one example, CCFI and/or DL ACK can be mapped to pairs of adjacent subcarriers, which can be scrambled and shifted according to a cell identifier.

According to related aspects, a method for transmitting control channel format information in wireless communications networks is provided. The method can comprise generating CCFI data that defines a structure of control channels subsequently transmitted over one or more antennas. Further, the method can include selecting subcarriers of bandwidth over which the CCFI data is spread based at least in part on shifting subcarriers utilized according to a cell identifier and transmitting the CCFI data over the selected subcarriers of bandwidth.

Another aspect relates to a wireless communications apparatus. The wireless communications apparatus can include at least one processor configured to select a portion of bandwidth for spreading CCFI data for one or more antennas based at least in part on a cell identifier and transmit the CCFI data, over the portion of bandwidth. The wireless communications apparatus can also include a memory coupled to the at least one processor.

Yet another aspect relates to a wireless communications apparatus that transmits control channel format information in wireless communications networks. The wireless communications apparatus can comprise means for generating CCFI data that defines a structure of subsequently transmitted control channels. The wireless communications apparatus can additionally include means for selecting a portion of bandwidth over which the CCFI data is spread based at least in part on reusably shifting over the bandwidth according to a cell identifier and means for transmitting the CCFI data over the selected portion of bandwidth.

Still another aspect relates to a computer program product, which can have a computer-readable medium including code for causing at least one computer to generate CCFI data that defines a structure of control channels subsequently transmitted over one or more antennas. The computer-readable medium can also comprise code for causing the at least one computer to select subcarriers of bandwidth over which the CCFI data is spread based at least in part on shifting subcarriers utilized according to a cell identifier. Moreover, the computer-readable medium can comprise code for causing the at least one computer to transmit the CCFI data over the selected subcarriers of bandwidth.

According to a further aspect, a method for receiving control channel format information in wireless communications networks is provided. The method can comprise receiving an initial portion of bandwidth in a time transmit interval (TTI) from a transmitting cell. The method can further include detecting frequency location of CCFI data throughout the portion of bandwidth and identifying the transmitting cell based at least in part on the location of CCFI data in the portion of bandwidth.

Another aspect relates to a wireless communications apparatus. The wireless communications apparatus can include at least one processor configured to detect frequency location of CCFI data in a received signal and identify a transmitter of the CCFI data based at least in part on the frequency location. The wireless communications apparatus can also include a memory coupled to the at least one processor.

Yet another aspect relates to a wireless communications apparatus for receiving control channel format information in a wireless communications network. The wireless communications apparatus can comprise means for determining frequency location of CCFI data throughout a received portion of bandwidth. The wireless communications apparatus can additionally include means for identifying a transmitting cell based at least in part on the location of CCFI data in the portion of bandwidth.

Still another aspect relates to a computer program product, which can have a computer-readable medium including code for causing at least one computer to receive an initial portion of bandwidth in a TTI from a transmitting cell. The computer-readable medium can also comprise code for causing the at least one computer to detect frequency location of CCFI data throughout the portion of bandwidth. Moreover, the computer-readable medium can comprise code for causing the at least one computer to identify the transmitting cell based at least in part on the location of CCFI data in the portion of bandwidth.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
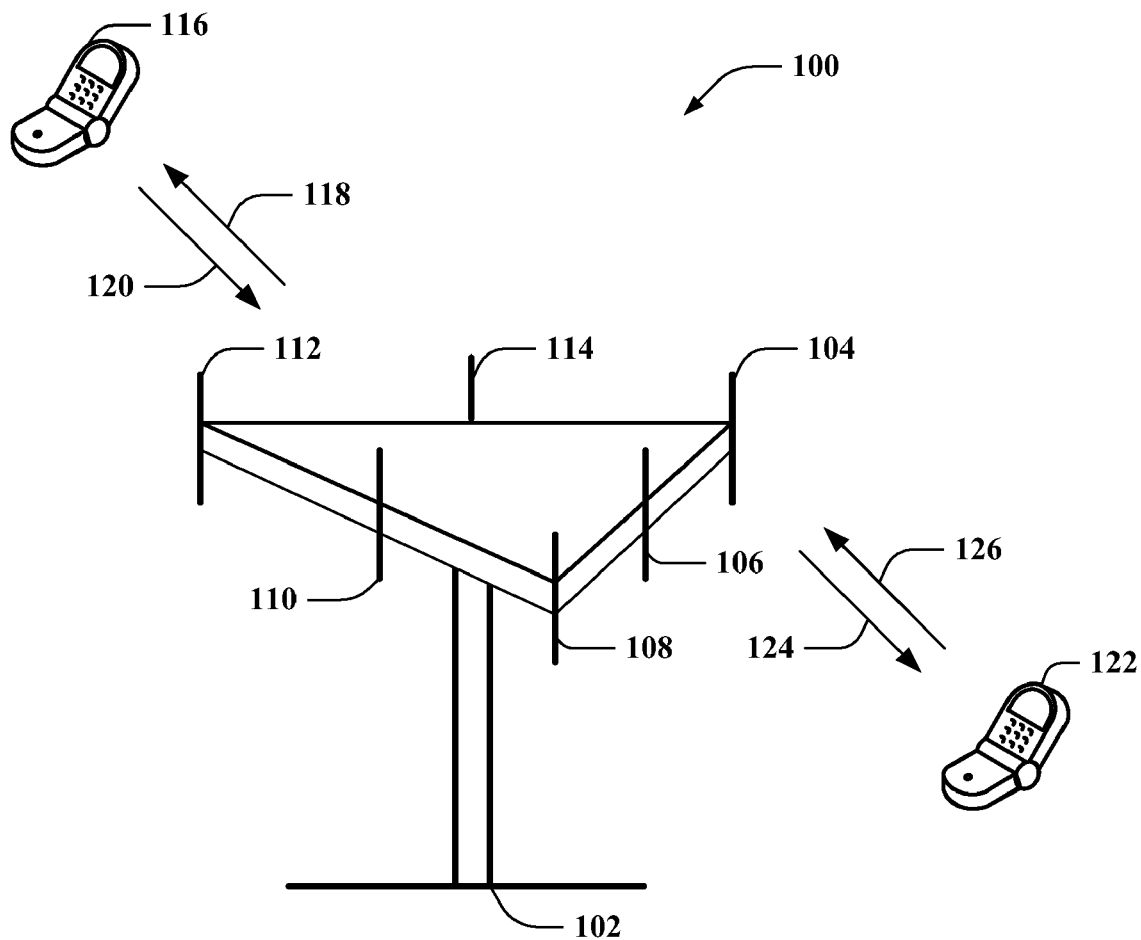
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition; these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as, the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device (s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile. Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station, 102 can communicate with one or more mobile devices such as mobile device 116 and mobile device 122; however, it is, to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAS, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology as depicted.

According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like. Moreover, one or more multiplexing schemes (e.g., OFDM) can be utilized to modulate multiple signals over a number of frequency subcarriers; the subcarriers can be associated with one another to form one or more communications channels. In one, example, a transmitter of the channels, such as base station 102 and/or mobile devices 116 and 122, can additionally transmit a pilot or reference signal to aid in synchronizing communications with the transmitter or estimating the channels. The channels can relate to transmitting communication data and/or control data, in one example, where the control data can specify quality metrics for the communication channel. In one example, the channels can be the physical downlink control channel, (PDCCH) and the physical downlink shared channel (PDSCH) both transmitted on downlinks 118 and/or 124.

To facilitate utilization of the control channels, a control channel format indicator (CCFI) can be transmitted to describe the structure of the control channel (and/or the shared communication data channel). In this regard, the CCFI can be transmitted in a first OFDM symbol of a given time transmit interval (TTI) so it is one of the first items received. Thus, for example, a CCFI transmitted over downlink 118 from base station 102 to mobile device 116 can indicate a number of subsequent OFDM symbols comprising control channels. Utilizing this information, the mobile device 116 can determine structure for the subsequent control channels.

According to an example, the number transmitted in the CCFI to indicate the number of subsequent subcarriers comprising control channels can be n, and a number of bits can be required to transmit n. It is to be appreciated that there can be an n specific to control channel types or related to substantially all control channels, for instance. In one example, where n can be 1, 2, or 3, 2 bits are required to transmit the number, and the CCFI can be coded by mapping the bits onto a number of sequences of quadrature phase shift keying (QPSK) symbols (such as 4 sequences of 16 QPSK symbols, in one example). In addition, the CCFI can be spread over subcarriers spanning the system bandwidth for the first OFDM symbol. This can include mapping the CCFI to specific adjacent pairs of subcarriers; the subcarriers chosen can be specific to a cell identifier (e.g., according to a cell specific shift or other reuse mechanism). In addition, the CCFI can be scrambled specific to a cell identifier. Moreover, in one example, the CCFI can hop for a given TTI according to the cell identifier.

In one example, the downlink (DL) acknowledgement (ACK) control channel can be transmitted according to the CCFI data specified in the first OFDM symbol. For example, the CCFI can specify a number of subsequent OFDM symbols, comprising the DL ACK channel. Subsequently, DL ACK data can be modulated into a number of QPSK symbols, spread over the next n OFDM symbols (e.g. via Hadamard/binary, discrete Fourier transform (DFT) spreading, and/or the like), and scrambled similarly to the CCFI data. Further, repetition can be employed in selecting frequencies for transmitting, the DL ACK data where each value of n can have a common or unique repetition factor. From this information, available transmission bandwidth for the control channels can be calculated and utilized. On the receiving side, as described, the mobile devices 116 and/or 122 can determine the control channel structure from the CCFI data in the first OFDM symbol, and accordingly decode the channels from the subsequent OFDM symbols.

Figure 2:
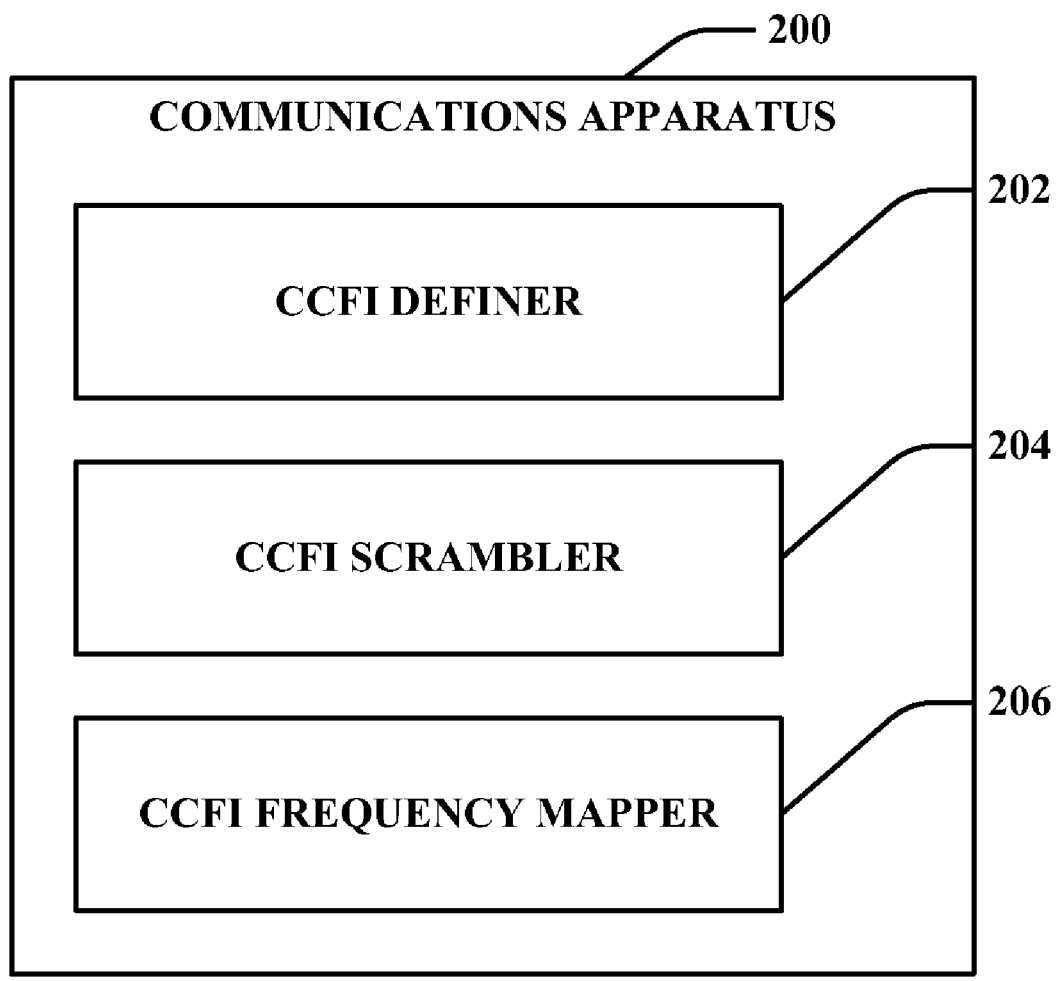
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data t transmitted in a wireless communications environment. The communications apparatus 200 can include a CCFI definer 202 that generates a CCFI based at, least in part on a determined number of subsequent OFDM symbols to comprise-control channels, a CCFI scrambler 204 that scrambles the CCFI according to a cell identifier, and a CCFI frequency mapper 206 that maps the CCFI to one or more adjacent subcarrier pairs of a first OFDM symbol for a given TTI.

According to an example, the communications apparatus 200 can define one or more control and/or data channels for which structure information can be transmitted as described herein. For example, the CCFI definer 202 can create a CCFI that indicates a number of subsequent OFDM symbols comprising one or more control channels; the CCFI can be defined as one or more bits, in one example. It is to be appreciated that the CCFI definer 202 can generate additional or alternative information for storage in the CCFI. The CCFI scrambler 204 can scramble the CCFI according to a cell specific scrambling (e.g., based at least in part on or mapped to a cell identifier). Moreover, the CCFI scrambler 204, or another component of the communications apparatus 200, can modulate the scrambled CCFI over a number of QPSK symbols. The CCFI frequency mapper 206 can map the symbols to one or more adjacent subcarrier pairs (or single subcarriers, triplets, quadruplets, etc.), for transmission thereof.

For example, the CCFI frequency mapper 206 can utilize adjacent pairs of subcarriers so that the structure is compatible with single transmit antennas and/or space frequency block code (SFBC) for 2 and 4 transmit antennas. Additionally, by utilizing the first OFDM symbol in a given TTI, a receiver of the CCFI transmission can discern information regarding the subsequent OFDM symbols as far as the control channels comprised therein as described. In one example, the first OFDM symbol for a TTI can additionally comprise reference signals for one or more antennas (not shown) of the communications apparatus 200. The CCFI frequency mapper 206 can map the CCFI information to adjacent subcarriers between reference signals (of disparate or the same antennas) in the first OFDM symbol of one or more TTIs, in one example.

Moreover; in an example, the CCFI frequency mapper 206 can shift the subcarriers utilized to transmit the CCFI over a number of useful subcarriers; this can provide cell identification based at least in part of the shifting or reuse scheme chosen for a given cell. It is to be appreciated that the number of available shifting or reuse schemes can be based at least in part on the available bandwidth for transmission as well as separation of the bandwidth into sets of subcarriers. For example, the CCFI frequency mapper 206 can separate a number of available subcarriers into triplets, which are sets of three adjacent subcarriers. Depending on the number of QPSK modulation symbols used to transmit the CCFI, a required number of subcarrier pairs can be determined for transmitting the CCFI in the first OFDM symbol, and the subcarrier pairs can be transmitted in disparate triplets to ensure less cells are transmitting the CCFI at the same frequency and/or at, the same time. For example, where 16 QPSK modulation symbols are utilized to transmit CCFI adjacent frequency subcarrier pairs in given triplets, for 75 useful subcarriers (25 triplets), the reuse factor can be 3 as there can be 3 different ways to concurrently utilize the triplets to effectively transmit the CCFI, as further described infra. In addition, DL ACK can utilize this or a similar mapping to reduce inter-cell interference. Thus, for a given number of QPSK symbols utilized to transmit the DL ACK, the data can be spread over a number of triplets and reused or shifted among the triplets in subsequent portions of bandwidth (e.g., OFDM symbols) for different cells. Moreover, a larger spreading factor can be utilized for DL ACK transmission by increasing the number of contiguous triplets in a group. For example, where 2 triplets are utilized, the DL ACK channel can evenly spread over the 2 triplet groups to transmit information.

Figure 3:
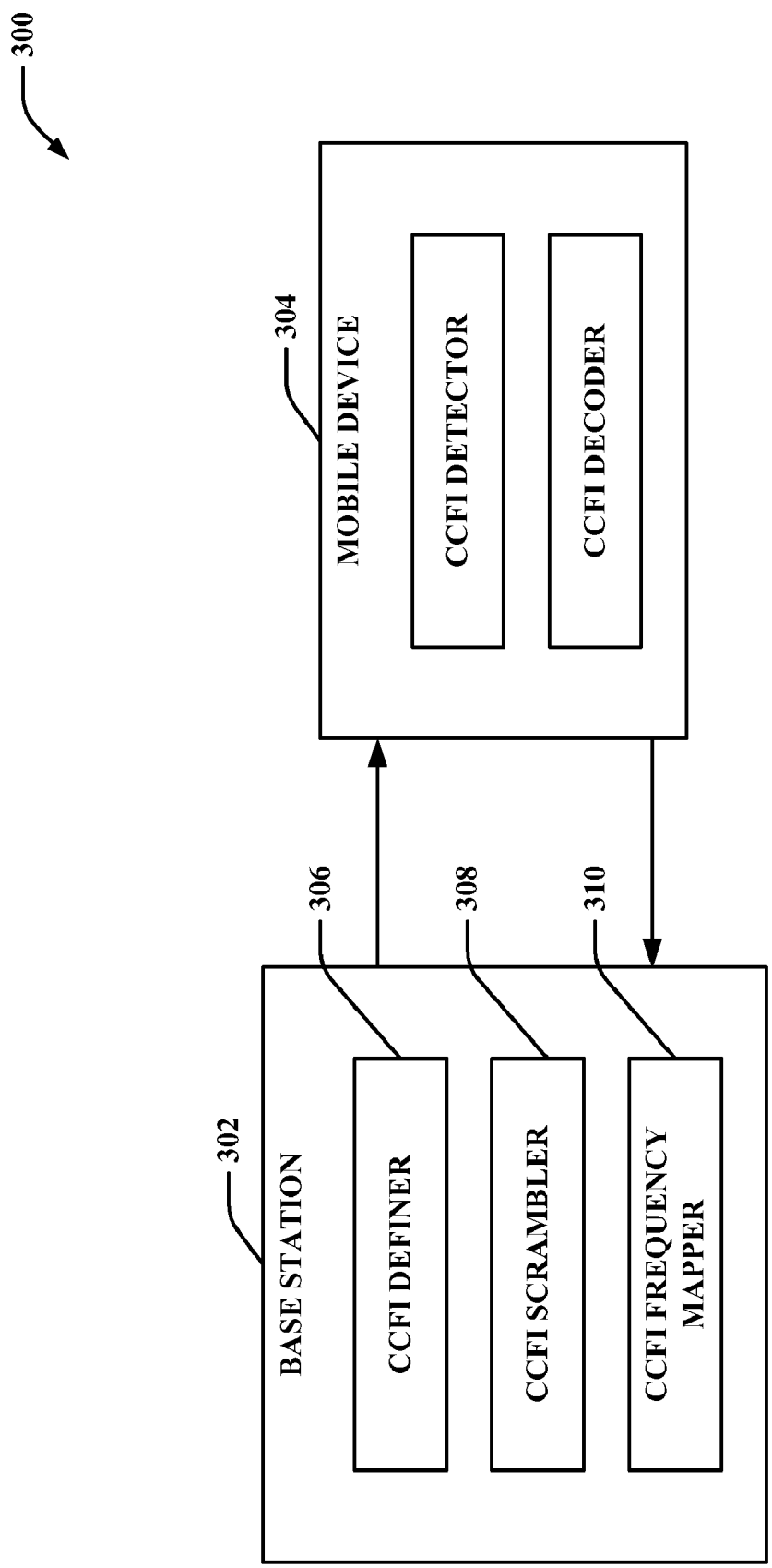
FIG. 3 is an illustration of an example wireless communications system that effectuates communicating CCFI data and/or DL ACK over selected frequencies.

Now referring to FIG. 3, illustrated is a wireless communications system 300 that communicates CCFI to describe one or more control and/or data channels. The system 300 includes a base station 302 that communicates with a mobile device 304 (and/or any number of disparate, mobile devices (not shown)). Base station 302 can transmit information to mobile device 304 over a forward link or downlink channel; further base station 302 can receive information from mobile device 304 over a reverse link or uplink channel. Moreover, system 300 can be a MIMO system. Also, the components and functionalities shown and described below in the base station 302 can be present in the mobile device 304 as well and vice versa, in one example; the configuration depicted excludes these components for ease of explanation.

Base station 302 includes a CCFI definer 306 that generates CCFI data to describe subsequent control channels, a CCFI scrambler 308 that scrambles the CCFI data to provide some cell identification, and a CCFI frequency mapper 310 that can map the CCFI data over a number of frequency subcarriers, which can provide additional or alternative cell identification. In one example, as described, the CCFI frequency mapper 310 can map CCFI data over subcarriers of a first OFDM symbol in a TTI. In this regard, the mobile device 304 can initially receive the CCFI, which can be utilized to determine control channel format for subsequent OFDM symbols.

Mobile device 304 includes a CCFI detector 312 that can determine CCFI data position in frequency over which the CCFI is mapped as well as a CCFI decoder 314 that can decode the CCFI data from the mapped frequency positions. For example, the mobile device 304 can receive bandwidth, such as a first OFDM symbol, comprising CCFI data. The CCFI detector 312 can determine location of the CCFI data in the bandwidth and the CCFI decoder 314 can interpret the CCFI data. For example, as described, the CCFI frequency mapper 310 can assign pairs of adjacent subcarriers in a first OFDM symbol in a TTI (or substantially any OFDM symbol or symbols in the TI) to transmit the CCFI data. In one example, the CCFI data can be between one or more reference signals for given antennas of the base station 302 (not shown). The CCFI frequency mapper 310 can additionally spread the data throughout adjacent subcarrier pairs (or triplets, quadruplets, etc.) of the OFDM symbol to account for a number of QPSK symbols required or desired to transmit the CCFI data. The CCFI detector 312, upon receiving the OFDM symbol or symbols comprising the data, can determine which subcarriers transmitted the data and accordingly decode the data utilizing the CCFI decoder 314 and/or determine a transmitting cell thereof based at least in part on which subcarriers were utilized, in transmission. Additionally, the mobile device 304 can utilize the decoded CCFI data to determine information related to the structure of subsequent control and/or data channels (such as a number of subsequent OFDM symbols comprising control channels).

Figure 4:
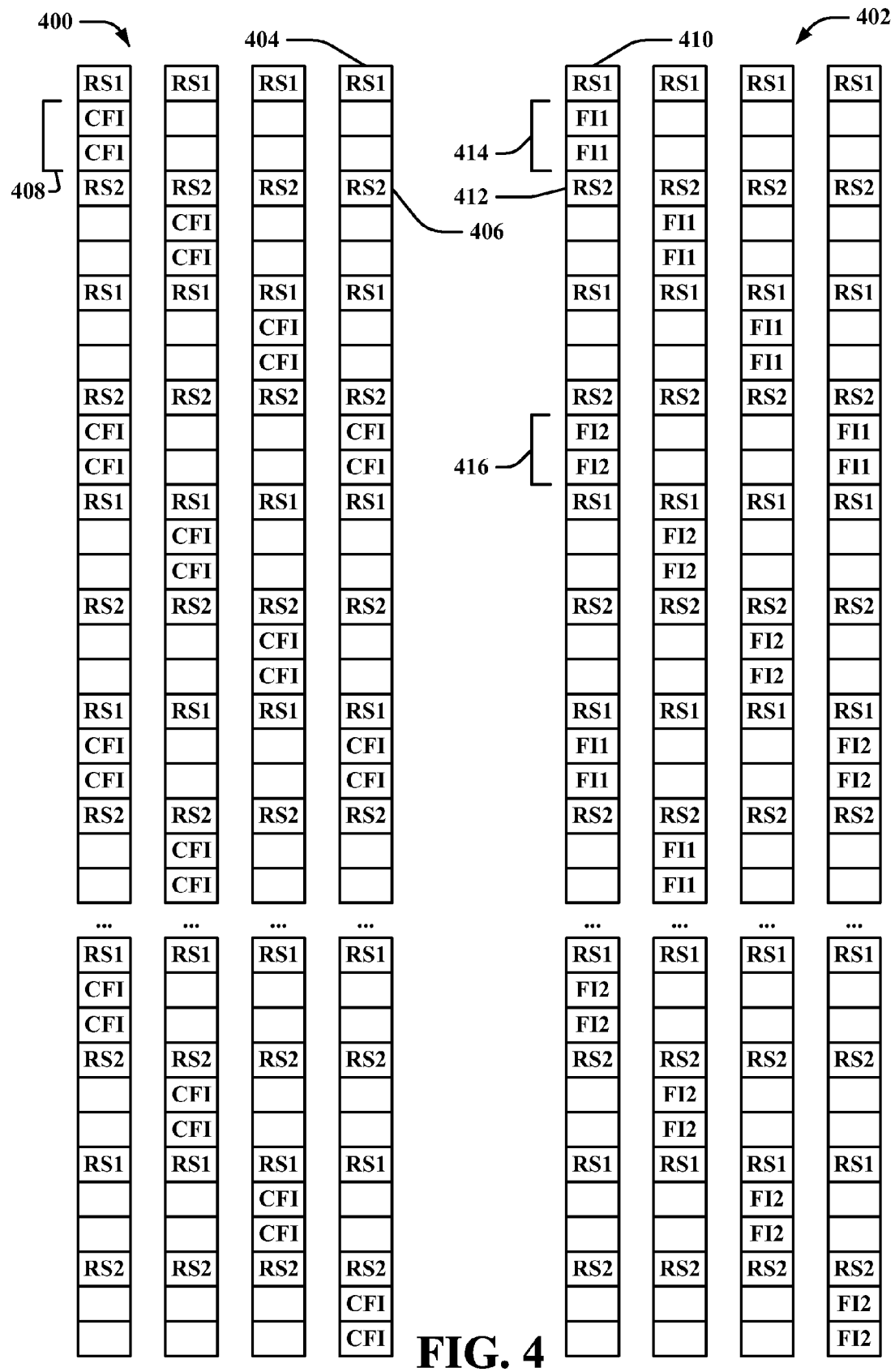
FIG. 4 is an illustration of an example configuration for selecting frequencies for transmitting CCFI and/or DL ACK data.

Turning now to FIG. 4, illustrated are example OFDM symbols 400 and 402 for a plurality of cells over which CCFI data is transmitted. It is to be appreciated that the OFDM symbols can alternatively be substantially any divided bandwidth such that the portions can be separately defined and interpreted. OFDM symbols 400 can represent 4 OFDM symbols from different cells where CCFI information is transmitted from each cell. In this regard, for example, the OFDM symbols can be the first transmitted in a given TTI for each of the 4 cells. Reference signals 404 and 406 are transmitted at each cell for each antenna (2 transmit antennas in this case) over a number of subcarriers as shown. In this example, the CCFI data can be transmitted in adjacent pairs of subcarriers over the OFDM symbols, such as adjacent pair 408. The subcarriers chosen can be shifted as a function of the number of QPSK symbols required to transmit the CCFI data as well as the number of available subcarriers (or sets of subcarriers, such as triplets).

The example OFDM symbols 400 can be configured, for example, for 16 QPSK symbols required over 75 available subcarriers (or 25 triplets). In this example, the subcarrier pairs comprising the CCFI data are evenly spread three triplets apart in a given OFDM symbol. This allows 8 pairs to be transmitted over a given OFDM symbol while maintaining maximum reuse. Thus, OFDM symbols for additional cells, as shown at 400, can shift the subcarriers utilized to transmit the CCFI data a number of triplets (e.g. +1, +2, or +3 as shown). This can additionally provide identification for the given cells. It is to be appreciated that additional spreading and shifting schemes can be used, in one example, to accord unique identification for the cells associated with one or more base stations, sectors, or antennas thereof. As described supra, the DL ACK channel can additionally utilize this or a similar configuration to reduce inter-cell interference.

The example OFDM symbols 402 can relate to 4 cells of a base station or sector having 4 transmit antennas. In this example, reference signals 410 and 412 are transmitted on the OFDM symbols, which can be the first, OFDM symbols of a TTI as described, along with CCFI data at 414 and different CCFI data at 416. It is to be appreciated that, although not shown, reference signals can be transmitted for antennas 3 and 4 as well. For example, the CCFI data at 414 can relate to control formatting for two antennas (such as 1 and 3) whereas the CCFI data at 416 can relate to control formatting for the other two antennas (such as 2 and 4). In addition, the two antennas for which CCFI data is not being transmitted can blank over the subcarrier pair to perform frequency switched transmit diversity across the antennal pairs (e.g. 1/3 and 2/4). Similarly, CCFI data can be spread in this example over the OFDM symbol. Thus, where 16 QPSK symbols are required for transmitting each portion of CCFI data, the shown example can work well for substantially 75 subcarriers (25 triplets) evenly spacing each CCFI data subcarrier pair by 3 triplets and alternating CCFI data transmission from each antenna pair at each triplet. In addition, shifting can be similarly employed as described for the 2 transmit antenna case. It is to be appreciated that similar schemes can be developed for a greater or lesser number of antennas and/or cells depending also on data size and number of available subcarriers.

Figure 5:
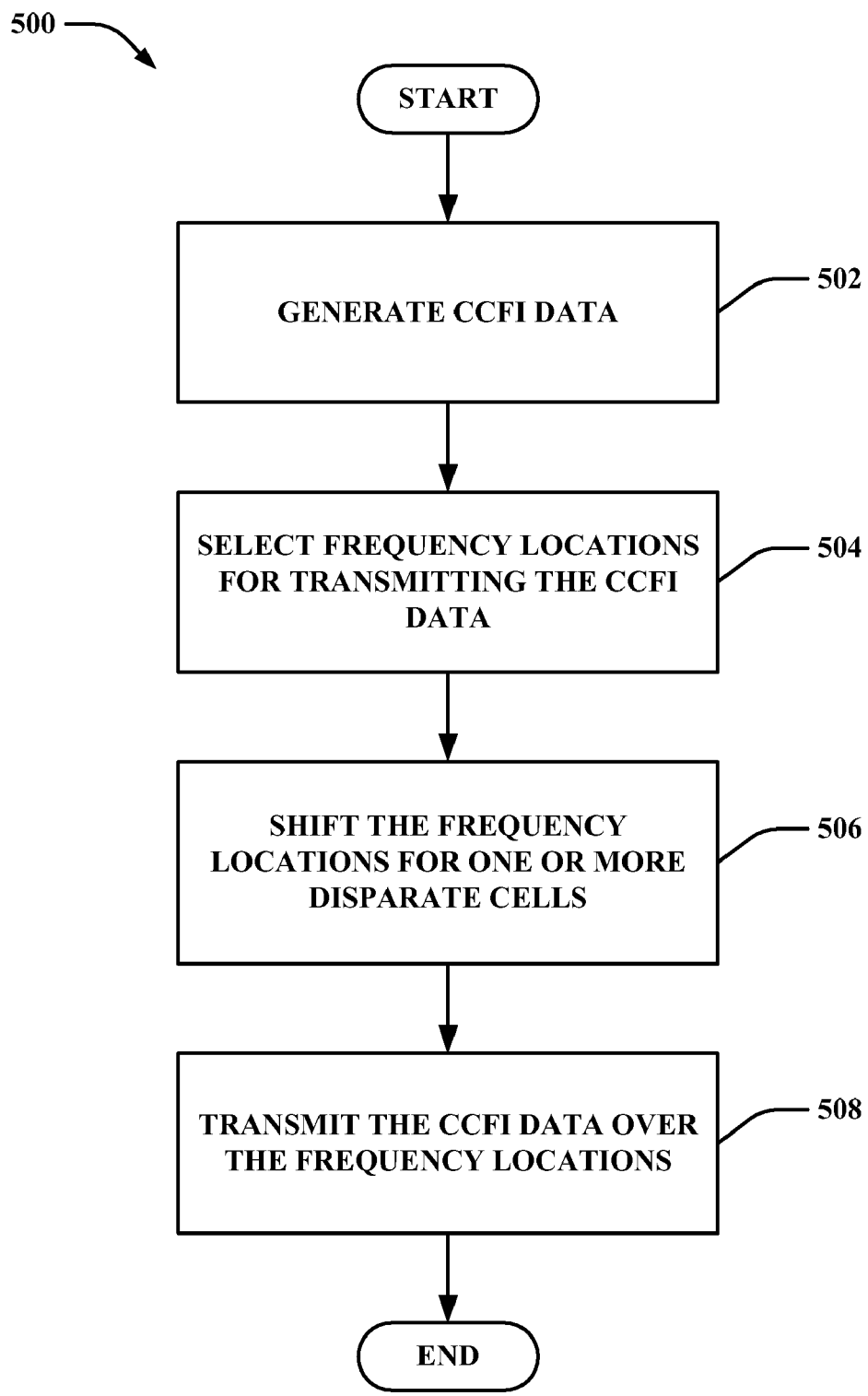
FIG. 5 is an illustration of an example methodology that facilitates selecting frequency for CCFI and/or DL ACK data.
Figure 6:
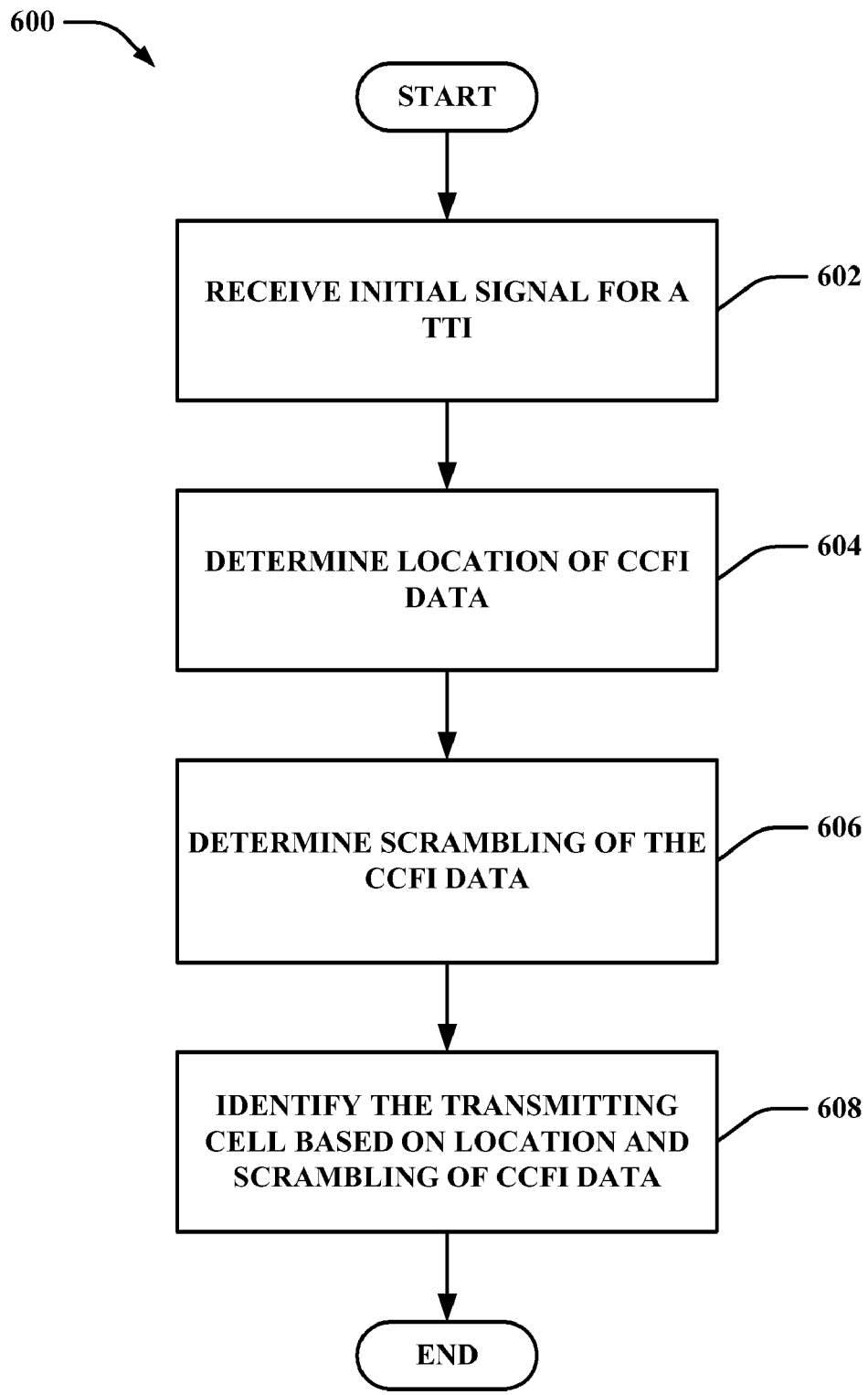
FIG. 6 is an illustration of an example methodology that facilitates receiving and interpreting, frequency selective CCFI data and/or DL ACK.

Referring to FIGS. 5-6, methodologies relating to, transmitting and receiving CCFI data in wireless communications networks are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of inter-related states or events, such as in a state diagram. Moreover, not all illustrated acts may be required to implement a methodology in accordance with one or more embodiments.

Turning to FIG. 5, a methodology 500 that facilitates transmitting CCFI data such to identify an associated cell is displayed. At 502, CCFI data is generated, which can relate to structure of subsequent control channels. In this regard, CCFI data can be sent before control channels so that a receiver knows the control channel and/or data channel, structure. At 504, frequency locations are selected for transmitting the CCFI data. As described, the locations can be based at least in part on a number of QPSK symbols required to transmit the CCFI data as well as a size of the available bandwidth. In one example, the bandwidth can comprise an initial OFDM symbol of a TTI having a plurality of subcarriers. Thus, the subcarriers chosen can depend on the amount available, as described; in one example, subcarriers between reference signals can be selected for transmitting the CCFI data.

At 506, the frequency locations can be shifted for one or more disparate cells. This ensures that less cells are transmitting the CCFI at the same frequency and/or at the same time; in addition, shifting of frequency locations can be utilized by a receiver, at least in part; to identify the transmitting cell. In the OFDM symbol example, the available subcarriers can be grouped into adjacent collections, such as triplets as described. Accordingly, the CCFI data can be evenly spaced among the triplets. For given cells, the CCFI data can be shifted to an, offset of triplets, providing an identifying factor for the cell as described supra. In addition, the CCFI data can be scrambled to provide cell identification. At 508, the CCFI data is transmitted over the chosen frequency locations.

Turning to FIG. 6, illustrated is a methodology 600 that facilitates receiving CCFI data, and identifying a transmitter thereof based on the frequency location of the data. At 602, an initial signal for a TTI is received. As described, this can be an initial OFDM symbol comprising a plurality of subcarriers. The subcarriers can additionally comprise reference signals as well as CCFI data. At 604, location of the CCFI data can be determined; this can be a subcarrier location, for example. At 606, a scrambling of the CCFI data is determined. Using this information, at 608, the cell transmitting the CCFI data can be uniquely identified as further described supra. For example, the CCFI data can be shifted in the OFDM symbol as compared to other transmitted symbols providing an identifying factor. Additionally, the CCFI data can be utilized to determine aspects related to subsequent control and/or data channels.

It will be appreciated that, in accordance with one or more aspects described herein, inferences can be made regarding determining a transmitting cell based at least in part on CCFI data location and/or scrambling as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 7:
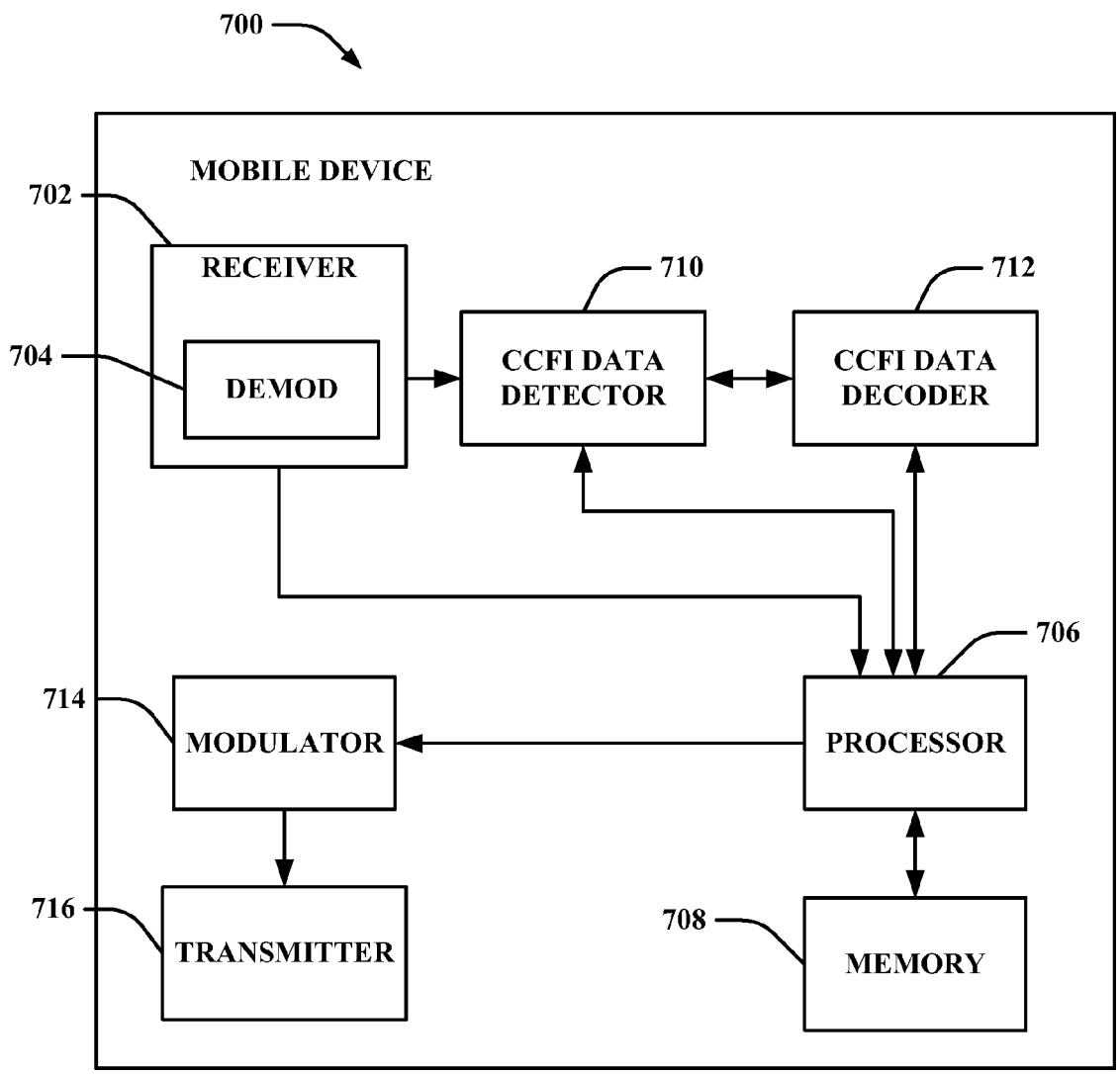
FIG. 7 is an illustration of an example mobile device that facilitates interpreting CCFI data and/or DL ACK.

FIG. 7 is a illustration of a mobile device 700 that facilitates receiving and interpreting CCFI data. Mobile device 700 comprises a receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate, received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (S RAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 706 and/or receiver 702 can further be operatively coupled to a CCFI data detector 710 that can determine frequency locations of CCFI from received bandwidth and a CCFI data decoder 712 that can decode or otherwise interpret the CCFI data. For example, the receiver 702 can receive an initial signal in a TTI, such as a first OFDM symbol, comprising CCFI data as well as other information (e.g. reference signals). The CCFI data detector 710 can determine frequency locations for the CCFI data in the received signals, such as subcarrier locations in an OFDM symbol. Utilizing this information, the CCFI data decoder 712 can not only decode the CCFI data to determine structure of one or more subsequent control or data channels, but also determine an identity of the cell transmitting the CCFI data, based at least in part on the frequency locations utilized to transmit the CCFI data (e.g., utilized subcarrier positions of the OFDM symbol) as described. Additionally, as shown supra, the CCFI data can be scrambled, and detection of a utilized scrambling can further identify the transmitting cell. Mobile device 700 still further comprises a modulator 714 and transmitter 716 that respectively modulate and transmit signal to, for instance, a base station, another mobile device, etc. Although depicted as being separate from the processor 706, it is to be appreciated that the CCFI data detector 710, CCFI data decoder 712, demodulator 704, and/or modulator 714 can be part of the processor 706 or multiple processors (not shown).

Figure 8:
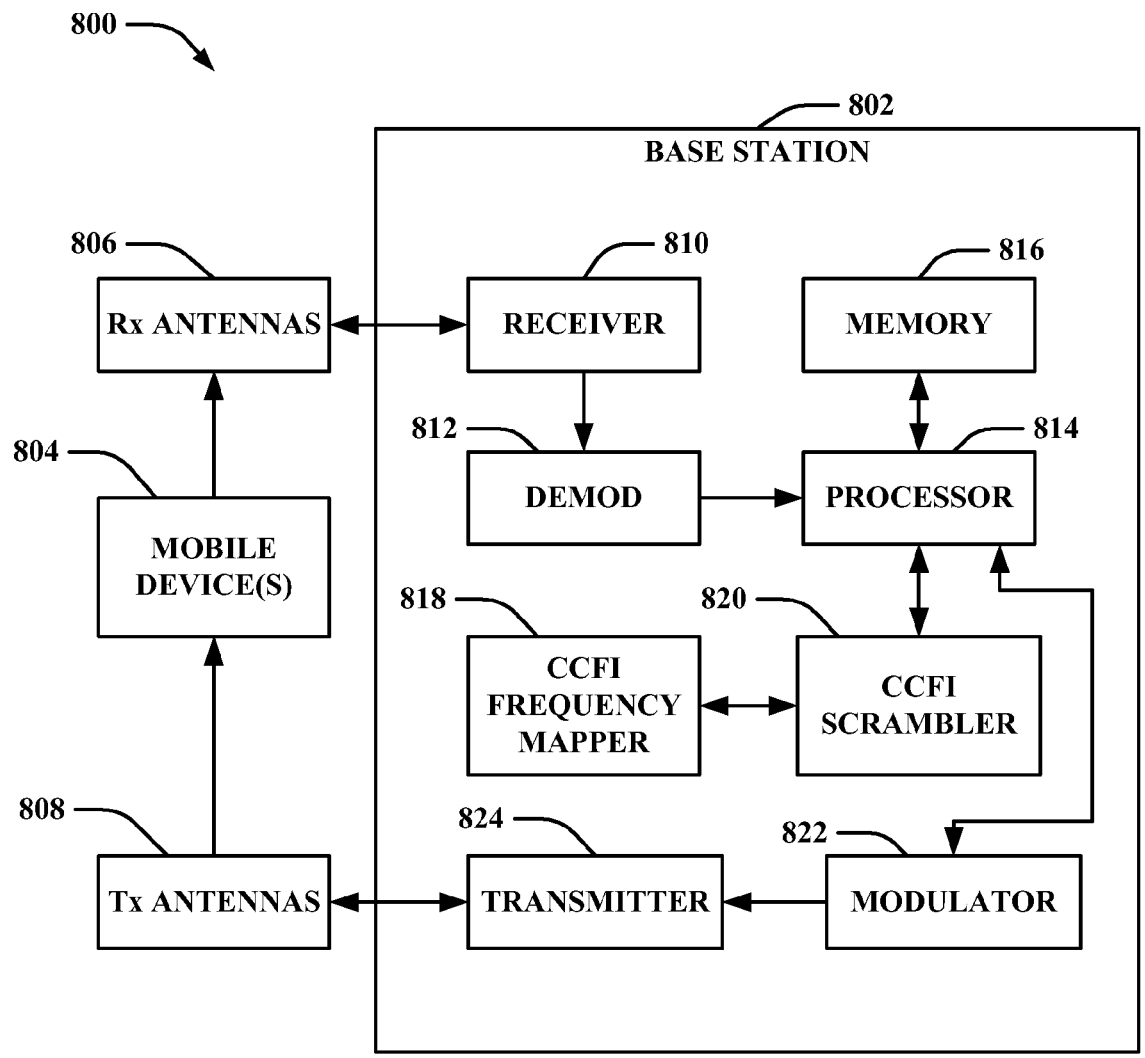
FIG. 8 is an illustration of an example system that facilitates transmitting frequency selective CCFI data and/or DL ACK.

FIG. 8 is an illustration of a system 800 that facilitates generating and selecting frequency for transmitting CCFI data. The system 800 comprises a base station 802 (e.g., access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a CCFI frequency mapper 818 that selects frequency locations for transmitting CCFI data as well as a CCFI scrambler 820 that scrambles the CCFI data.

According to an example, the processor 814, or a component coupled thereto, can generate CCFI data to transmit to one or more mobile devices 804 that describes structure of subsequent control channels as described. The CCFI frequency mapper 818 can select frequency locations to utilize in transmitting the CCFI data; the chosen locations can, at least in part, identify a cell to which the CCFI data relates. As described previously, the CCFI data can be evenly spread throughout bandwidth (such as an initial OFDM symbol of a TTI), based at least in part on a number of available subcarriers and a number of QPSK symbols needed to transmit the CCFI data. Moreover, the subcarriers utilized can be adjacent pairs and can be shifted depending on the cell transmitting the data Moreover, the CCFI scrambler 820 can scramble the CCFI data, which can additionally or alternatively be utilized to identify a transmitting cell. Furthermore, although depicted as being separate from, the processor 814, it is to be appreciated that the CCFI frequency mapper 818, CCFI scrambler 820, demodulator 812, and/or modulator 822 can be part, of the processor 814 or multiple processors (not shown).

Figure 9:
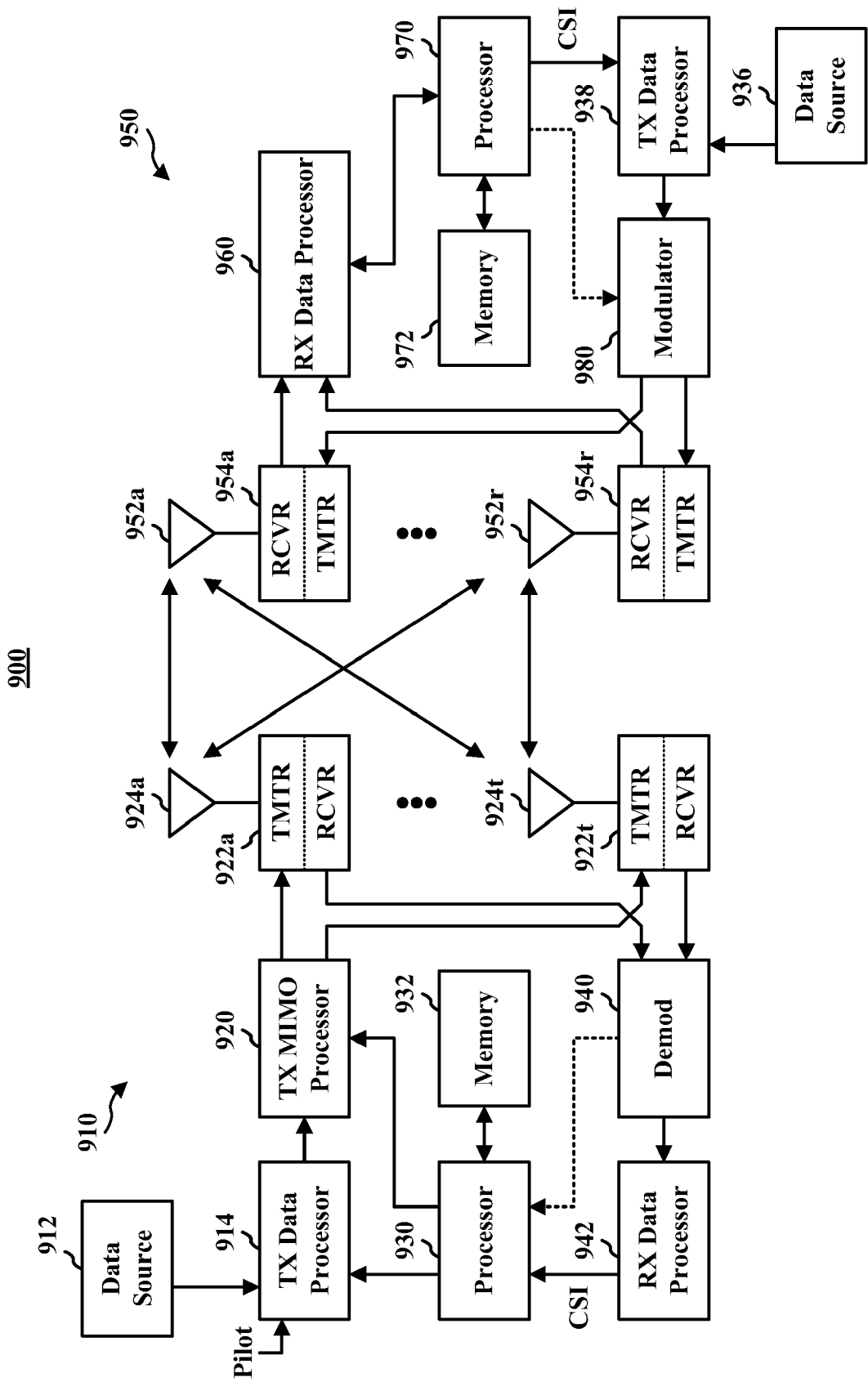
FIG. 9 is an illustration of an example wireless network environment that can be employed in conjunction, with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8), configurations (FIG. 4), and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division-multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme: (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data Streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further; $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link; message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented, within one or more application specific integrated circuits (ASICs), digital signal processors (DSPs) digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
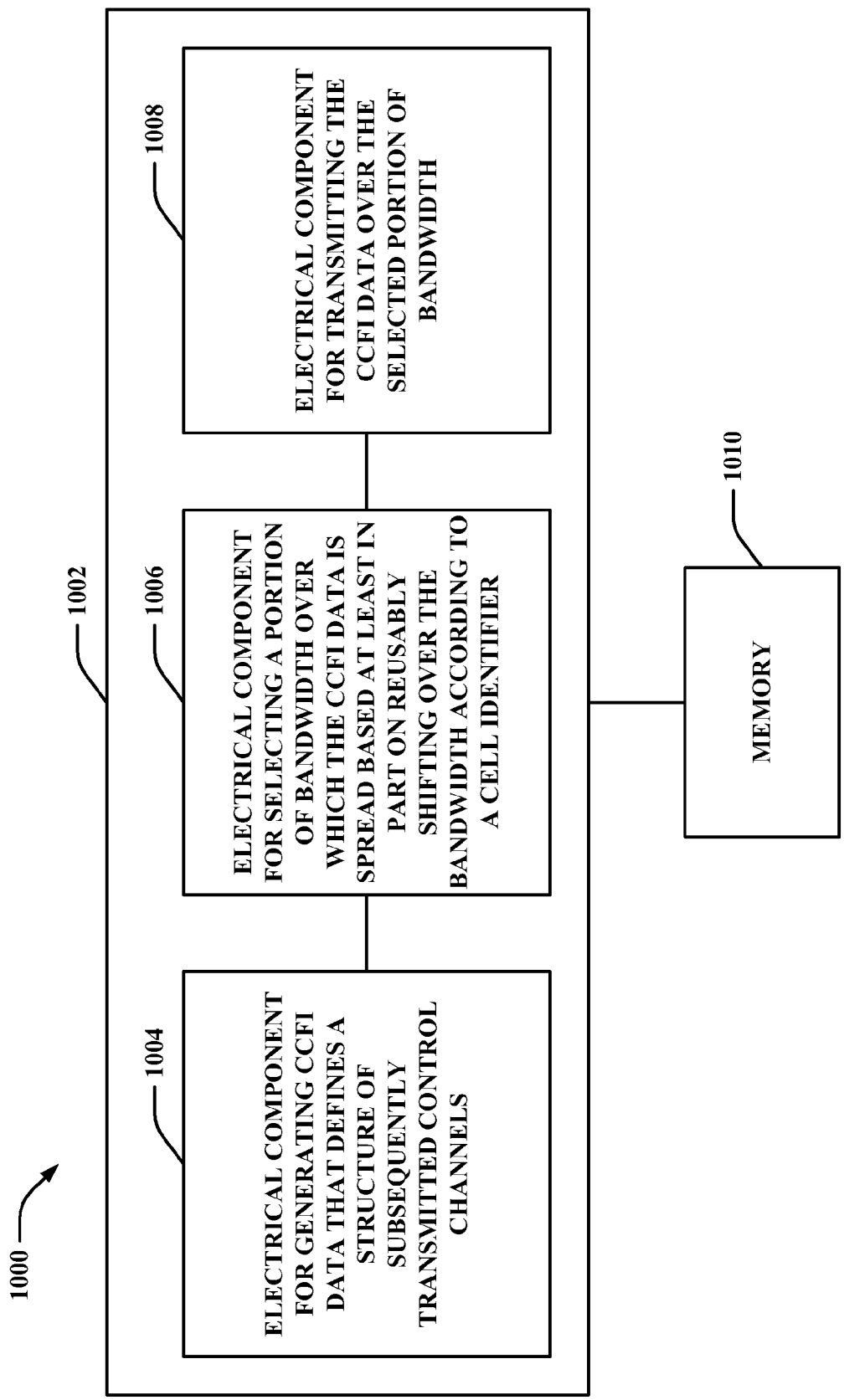
FIG. 10 is an illustration of an example system that generates and transmits frequency selective CCFI data and/or DL ACK.

With reference to FIG. 10, illustrated is a system 1000 that generates and selectively transmits CCFI data over chosen frequency portions. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for generating CCFI data that defines a structure of subsequently transmitted control channels 1004. For example, the CCFI data can relate to a number of subsequent OFDM symbols comprising control data. Further, logical grouping 1002 can comprise an electrical component for selecting a portion of bandwidth over which the CCFI data is spread based at least in part on reusably shifting over the bandwidth according to a cell identifier 1006. For example, frequency can be chosen based at least in part on available frequency and that required to transmit the CCFI data. The chosen frequency can be shifted for a given cell to uniquely identify the cell; in this regard, the bandwidth is reused in such a way to identify the transmitter of the CCFI data as described previously. Additionally, the CCFI data can be mapped in an initial OFDM symbol of a TTI, for example, so that a receiver can determine control channel structure before receiving the control channels. Moreover, logical grouping 1002 can comprise and electrical component for transmitting the CCFI data over the selected portion of bandwidth 1008. In one example, receiving devices can utilize the transmitted CCFI data to identify the transmitting cell. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Figure 11:
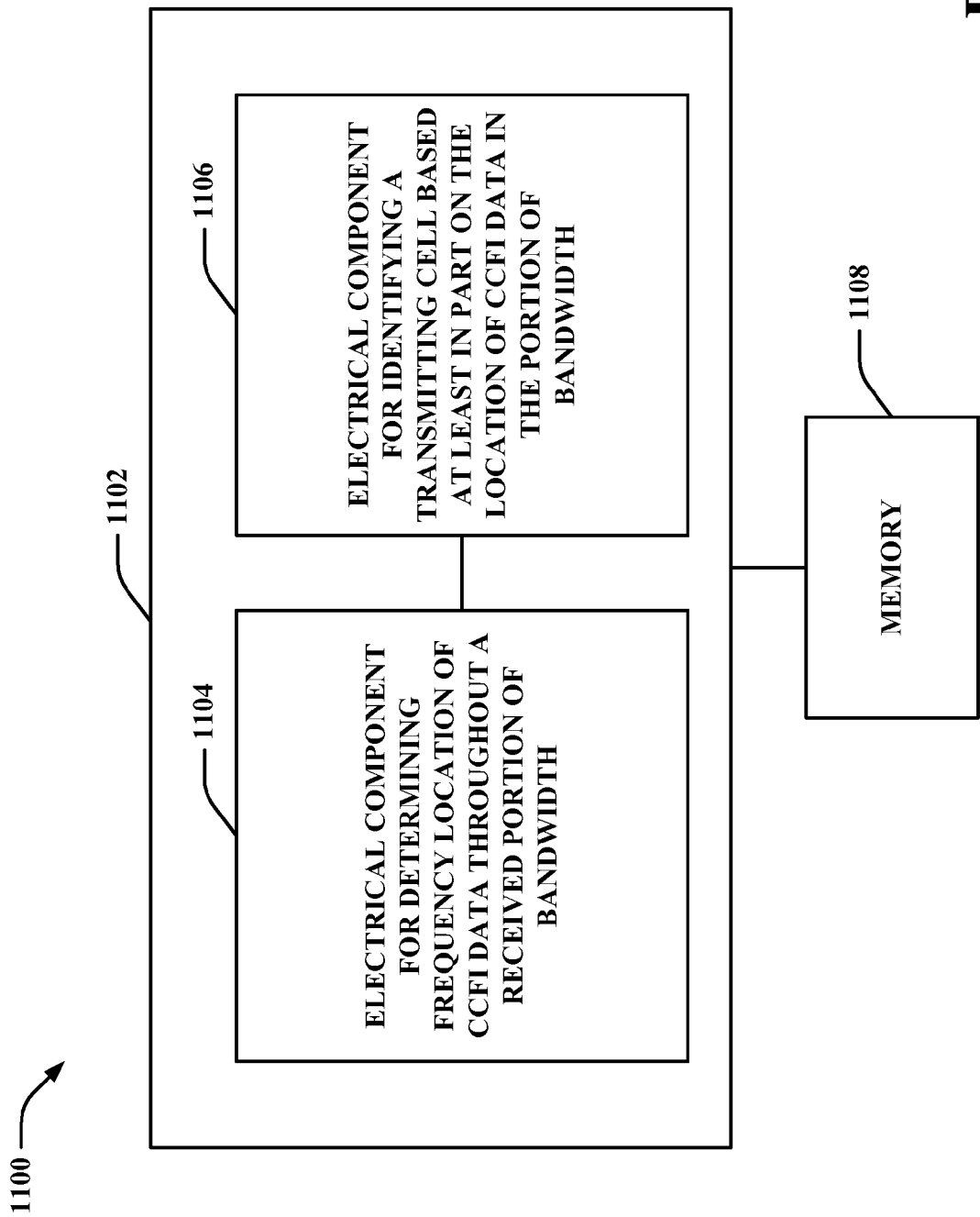
FIG. 11 is an illustration of an example system that determines location of CCFI data and/or DL ACK and identifies a transmitting cell.

Turning to FIG. 11, illustrated is a system 1100 that receives and interprets CCFI data in a wireless communications network. System 1100 can reside within a base station, mobile device, etc., for instance. As depicted, system 1100 includes functional blocks that can represent functions implemented by a processor, software, or combination thereof (e.g., firmware). System 1100 includes a logical grouping 1102 of electrical components that facilitate receiving and utilizing CCFI data. Logical grouping 1102 can include an electrical component for determining frequency location of CCFI data throughout a received portion of bandwidth 1104. Such information not only allows a receiver to identify the transmitter of the information, but also to decode the CCFI data, which can be used in determining structure of subsequent control and/or data channels. Moreover, logical grouping 1102 can include an electrical component for identifying a transmitting cell based at least in part on the location of CCFI data in the portion of bandwidth 1106. Thus, the CCFI data can be spread throughout the bandwidth and shifted such to identify a transmitting cell, as described supra. Additionally, system 1100 can include a memory 1108 that retains instructions for executing functions associated with electrical components 1104 and 1106. While shown as being external to memory 1108, it is to be understood that electrical components 1104 and 1106 can exist within memory 1108.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is, used in either the detailed description or the claims, such term is intended to be inclusive in a manner similar to the term "comprising" as "comprising" is interpreted when employed as a transitional word in a claim.

What is claimed is:

1. A method for transmitting control channel format information in wireless communications networks, comprising:
    generating control channel format indicator (CCFI) data that defines a structure of control channels subsequently transmitted over one or more antennas;
    selecting subcarriers of bandwidth over which the CCFI data is spread based at least in part on shifting subcarriers utilized according to a cell identifier; and
    transmitting the CCFI data over the selected subcarriers of bandwidth.

2. The method of claim 1, further comprising scrambling the CCFI data according to the cell identifier.

3. The method of claim 1, the subcarriers are further selected according to a number of quadrature phase shift keying (QPSK) symbols required for transmitting the CCFI data as well as a number of available subcarriers.

4. The method of claim 1, the subcarriers are of a first orthogonal frequency division multiplexing (OFDM) symbol in a given time transmit interval (TTI).

5. The method of claim 4, the subcarriers are a plurality of adjacent subcarrier pairs.

6. The method of claim 5, the adjacent subcarrier pairs are positioned between subcarriers utilized for transmitting reference signals.

7. The method of claim 1, further comprising selecting disparate subcarriers of bandwidth for spreading CCFI data generated for one or more disparate antennas.

8. The method of claim 7, further comprising alternating selection of the subcarriers and the disparate subcarriers over the bandwidth.

9. A wireless communications apparatus, comprising: at least one processor configured to: generate control channel format indicator (CCFI) data that defines a structure of control channels subsequently transmitted over one or more antennas; select a portion of bandwidth for spreading control channel format indicator (CCFI) data for one or more antennas based at least in part on a cell identifier; and transmit the CCFI data over the portion of bandwidth; and a memory coupled to the at least one processor.

10. The wireless communications apparatus of claim 9, the at least one processor further configured to scramble the CCFI data according to the cell identifier.

11. The wireless communications apparatus of claim 10, the portion of bandwidth relates to a plurality of subcarriers of a first orthogonal frequency division multiplexing (OFDM) symbol in a time transmit interval (TTI).

12. The wireless communications apparatus of claim 11, the subcarriers are further selected according to a number of quadrature phase shift keying (QPSK) symbols required for transmitting the CCFI data as well as a number of available subcarriers.

13. The wireless communications apparatus of claim 12, the selected subcarriers are a plurality of adjacent subcarrier pairs positioned between one or more reference signals related to one or more antennas of the wireless communications apparatus.

14. The wireless communications apparatus of claim 9, the at least one processor further configured to select disparate portions of bandwidth for spreading CCFI data related to one or more disparate antennas.

15. The wireless communications apparatus of claim 14, the selected portions of bandwidth and the selected disparate portions of bandwidth alternate across the bandwidth.

16. A wireless communications apparatus that transmits control channel format information in wireless communications networks, comprising:
   means for generating control channel format indicator (CCFI) data that defines a structure of subsequently transmitted control channels;
   means for selecting a portion of bandwidth over which the CCFI data is spread based at least in part on reusably shifting over the bandwidth according to a cell identifier; and
   means for transmitting the CCFI data over the selected portion of bandwidth.

17. The wireless communications apparatus of claim 16, further comprising means for scrambling the CCFI data according to the cell identifier.

18. The wireless communications apparatus of claim 16, the portion of bandwidth relates to subcarriers of a first orthogonal frequency division multiplexing (OFDM) symbol in a given time transmit interval (TTI).

19. The wireless communications apparatus of claim 18, the subcarriers are further selected according to a number of quadrature phase shift keying (QPSK) symbols required for transmitting the CCFI data as well as a number of available subcarriers.

20. The wireless communications apparatus of claim 19, the subcarriers are a plurality of adjacent subcarrier pairs positioned between subcarriers utilized for transmitting reference signals related to one or more antennas.

21. The wireless communications apparatus of claim 16, further comprising means for spreading control channel data over subsequent portions of bandwidth according to the structure defined in the CCFI data.

22. The wireless communications apparatus of claim 16, further comprising means for selecting a disparate portion of bandwidth for spreading CCFI data generated for one or more disparate antennas.

23. The wireless communications apparatus of claim 22, the selection of the portion of bandwidth and the disparate portion of bandwidth alternates over the bandwidth.

24. A computer program product, comprising: a non-transitory computer-readable medium comprising: code for causing at least one computer to generate control channel format indicator (CCFI) data that defines a structure of control channels subsequently transmitted over one or more antennas; code for causing the at least one computer to select subcarriers of bandwidth over which the CCFI data is spread based at least in part on shifting subcarriers utilized according to a cell identifier; and code for causing the at least one computer to transmit the CCFI data over the selected subcarriers of bandwidth.

25. The computer program product of claim 24, the computer-readable medium further comprising code for causing the at least one computer to scramble the CCFI data according to a cell identifier.

* * * * *